United States Patent
Zhang et al.

(10) Patent No.: US 10,771,374 B2
(45) Date of Patent: Sep. 8, 2020

(54) DELAY MEASUREMENT METHOD AND DEVICE

(71) Applicant: Huawei Technologies Co., Ltd., Shenzhen (CN)

(72) Inventors: Xiquan Zhang, Dongguan (CN); Jianmin Song, Dongguan (CN); Jiahong Wei, Dongguan (CN); Lin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/413,186

(22) Filed: May 15, 2019

(65) Prior Publication Data

US 2019/0268257 A1 Aug. 29, 2019

Related U.S. Application Data

(63) Continuation of application No. PCT/CN2017/110879, filed on Nov. 14, 2017.

(30) Foreign Application Priority Data

Nov. 15, 2016 (CN) .......................... 2016 1 1006034

(51) Int. Cl.
*H04L 12/727* (2013.01)
*H04L 12/26* (2006.01)
*H04L 12/741* (2013.01)

(52) U.S. Cl.
CPC ........ *H04L 45/121* (2013.01); *H04L 43/0852* (2013.01); *H04L 43/50* (2013.01); *H04L 45/74* (2013.01)

(58) Field of Classification Search
None
See application file for complete search history.

(56) References Cited

U.S. PATENT DOCUMENTS 6,470,031 B1 * 10/2002 Loy ...................... H04L 43/106
370/503
7,707,379 B2 4/2010 Bartley et al.
(Continued)

FOREIGN PATENT DOCUMENTS

CN 101827098 A 9/2010
CN 101926146 A 12/2010
(Continued)

OTHER PUBLICATIONS

Foreign Communication From A Counterpart Application, European Application No. 17872530.5, Extended European Search Report dated Sep. 16, 2019, 6 pages.
(Continued)

*Primary Examiner* — Brian S Roberts
(74) *Attorney, Agent, or Firm* — Conley Rose, P.C.

(57) ABSTRACT

A physical layer chip of a first physical port of a network device receives a packet and sends a first time stamp and the packet to a Media Access Control (MAC) chip of the first physical port. The MAC chip of the first physical port adds the first time stamp to the packet and sends the packet. A MAC chip of a second physical port receives the packet, extracts the first time stamp of the packet, and sends the packet to a physical layer chip of the second physical port. The MAC chip of the second physical port receives a second time stamp of the packet. The network device calculates a processing delay for the packet. The processing delay is a value obtained by subtracting the first time stamp from the second time stamp.

20 Claims, 3 Drawing Sheets

(56) References Cited

U.S. PATENT DOCUMENTS

| | | | |
|---|---|---|---|
| 7,953,528 | B2 | 5/2011 | Oesterling et al. |
| 8,358,713 | B2 | 1/2013 | Govindarajulu |
| 8,427,958 | B2 | 4/2013 | Ko et al. |
| 9,154,394 | B2 | 10/2015 | Ko et al. |
| 2002/0021717 | A1* | 2/2002 | Hedayat ............ H04J 3/0697 370/508 |
| 2005/0152330 | A1* | 7/2005 | Stephens ............ H04B 7/269 370/350 |
| 2005/0207387 | A1* | 9/2005 | Middleton ............ H04J 3/0682 370/347 |
| 2008/0016308 | A1 | 1/2008 | Bartley et al. |
| 2009/0067554 | A1 | 3/2009 | Govindarajulu |
| 2009/0164551 | A1 | 6/2009 | Oesterling et al. |
| 2009/0190589 | A1* | 7/2009 | Bains ............ H04J 3/0697 370/392 |
| 2011/0267952 | A1 | 11/2011 | Ko et al. |
| 2012/0075999 | A1 | 3/2012 | Ko et al. |
| 2014/0056143 | A1 | 2/2014 | Hedlund et al. |
| 2014/0092918 | A1 | 4/2014 | Jost |
| 2016/0315860 | A1 | 10/2016 | Nichols |

FOREIGN PATENT DOCUMENTS

| | | |
|---|---|---|
| CN | 101997774 A | 3/2011 |
| CN | 105207734 A | 12/2015 |
| EP | 2296318 A1 | 3/2011 |
| WO | 2006064278 A1 | 6/2006 |

OTHER PUBLICATIONS

ISO/IEC 10589, Information Technology—Telecommunications and information exchange between systems-Intermediate system to intermediate system intra-domain routeing information exchange protocol for use in conjunction with the protocol for providing the connectionless-mode network service (ISO 8473), second edition, Nov. 15, 2002, 19 pages.

Coulton R., "The OSPF Opaque LSA Option," RFC 2370, Jul. 1998, 15 pages.

Gredler, H., et al., "North-Bound Distribution of Link-State and Traffic Engineering (TE) Information Using BGP," RFC 7752, Mar. 2016, 48 pages.

Bradner, S., "Benchmarking Terminology for Network Interconnection Devices," RFC 1242, Jul. 1991, 12 pages.

ITU-T G.8261/Y.1361 Corrigendum 1, Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet of Things and Smart Cities, Internet protocol aspects—Transport, Timing and synchronization aspects in packet networks, Apr. 2016, 8 pages.

ITU-T G.8261/Y.1361 Amendment 1, Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet protocol aspects—Transport, Timing and synchronization aspects in packet networks, 8 pages.

ITU-T G.8261/Y.1361, Series G: Transmission Systems and Media, Digital Systems and Networks, Packet over Transport aspects—Quality and availability targets, Series Y: Global Information Infrastructure, Internet Protocol Aspects and Next-Generation Networks, Internet protocol aspects—Transport, Timing and synchronization aspects in packet networks, 116 pages.

Machine Translation and Abstract of Chinese Publication No. CN105207734, Dec. 30, 2015, 10 pages.

Foreign Communication From A Counterpart Application, PCT Application No. PCT/CN2017/110879, English Translation of International Search Report dated Jan. 31, 2018, 2 pages.

Foreign Communication From A Counterpart Application, PCT Application No. PCT/CN2017/110879, English Translation of Written Opinion dated Jan. 31, 2018, 3 pages.

Machine Translation and Abstract of Chinese Publication No. CN101827098, Sep. 8, 2010, 20 pages.

Machine Translation and Abstract of Chinese Publication No. CN101997774, Mar. 30, 2011, 10 pages.

Foreign Communication From A Counterpart Application, Chinese Application No. 201611006034.7, Chinese Office Action dated Aug. 26, 2019, 6 pages.

* cited by examiner

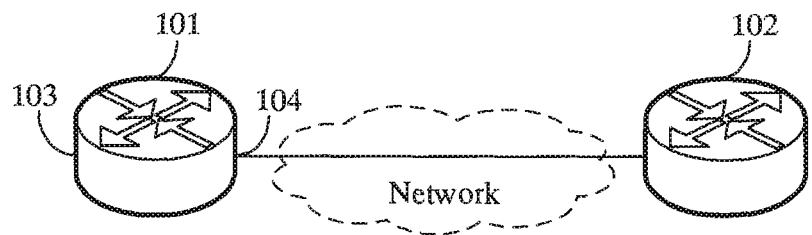

FIG. 1

```
S201: A physical layer chip of a first physical port
receives a packet and sends a first time stamp and the
packet to a MAC chip of the first physical port
```

```
S202: The MAC chip of the first physical port adds
the first time stamp to the packet and sends the packet
```

```
S203: A MAC chip of a second physical port receives
the packet, extracts the first time stamp, and sends the
packet to a physical layer chip of the second physical
port
```

```
S204: The MAC chip of the second physical port
receives a second time stamp
```

```
S205: A network device calculates a processing delay
for the packet
```

FIG. 2

DELAY MEASUREMENT METHOD AND DEVICE

CROSS-REFERENCE TO RELATED APPLICATIONS

This application is a continuation of International Patent Application No. PCT/CN2017/110879 filed on Nov. 14, 2017, which claims priority to Chinese Patent Application No. 201611006034.7 filed on Nov. 15, 2016. The disclosures of the aforementioned applications are hereby incorporated by reference in their entireties.

TECHNICAL FIELD

The present disclosure relates to the communications field, and in particular, to a delay measurement method and device.

BACKGROUND

Two-Way Active Measurement Protocol (TWAMP) is a two-way delay measurement technology mainly applied to full-path delay measurement and monitoring of an end-to-end service. Internet Protocol (IP) Flow Performance Measurement (FPM) is also a method applied to path delay measurement and monitoring of an end-to-end service, and cannot measure a delay generated when a single device processes a packet.

SUMMARY

This application provides a delay measurement method and device. The measurement method can more accurately measure a delay of a network device for processing a packet.

According to a first aspect, this application provides a delay measurement method, and the method includes the following. A physical layer chip of a first physical port of a network device receives a packet, and sends a first time stamp and the packet to a Media Access Control (MAC) chip of the first physical port. A value of the first time stamp is a time point at which the packet reaches the physical layer chip of the first physical port. The MAC chip of the first physical port adds the first time stamp to the packet and sends the packet. A MAC chip of a second physical port receives the packet, extracts the first time stamp of the packet, and then sends the packet to a physical layer chip of the second physical port. The MAC chip of the second physical port receives a second time stamp of the packet. The second time stamp is sent by the physical layer chip of the second physical port. A value of the second time stamp is a time point at which the packet reaches the physical layer chip of the second physical port. The network device calculates a processing delay for the packet. The processing delay is a value obtained by subtracting the first time stamp from the second time stamp.

To measure a network delay using a dedicated measurement packet not only occupies a bandwidth, but also may affect forwarding of another normal service packet. In the foregoing solution, the first time stamp is added to the packet, and the network device extracts the first time stamp from the packet such that it is very easy to match the first time stamp with the corresponding packet. Then, the processing delay of the network device is determined based on a difference obtained by subtracting the first time stamp from the second time stamp. Therefore, the foregoing solution may be used to measure a processing delay for any packet, for example, to measure a processing delay for a common data packet. In this way, not only a bandwidth is saved, but also the delay for the common data packet can be directly measured. In addition, delays measured using the method include delays from the physical layer chip at the ingress port of the network device to the physical layer chip at the egress port of the same network device. This not only makes a physical boundary of a measurement path clearer and more complete, but also can accurately distinguish and display forwarding delays for the network device. In addition, network congestion can be more accurately located after the delays in the network are segmented and distinguished.

In a possible implementation, the MAC chip of the second physical port sends the first time stamp and the second time stamp to a central processing unit (CPU), and the CPU calculates the delay.

In a possible implementation, the MAC chip of the second physical port calculates the processing delay for the packet. After calculating the processing delay for the packet, the MAC chip of the second physical port sends the delay to the CPU such that the CPU does not need to calculate the delay, thereby reducing load of the CPU.

In another possible implementation, the method further includes that the MAC chip of the first physical port adds an ingress port number of the packet to the packet before sending the packet. The ingress port number is a port number of an ingress port of the packet. The ingress port of the packet is the first physical port. A network processor of the network device extracts a priority and the ingress port number of the packet, and adds the priority and the ingress port number of the packet to a source MAC address field of the packet. The MAC chip of the second physical port obtains an egress port number of the packet, extracts the priority and the ingress port number of the packet from the source MAC address field of the packet, and sends the priority, the ingress port number, and the egress port number of the packet to a CPU. The egress port number is a port number of an egress port of the packet, and the egress port of the packet is the second physical port.

The source MAC address field is used to mark source information of the packet. After the network processor of the network device receives the packet and before the MAC chip of the egress port receives the packet, the source MAC address field does not need to be used. Therefore, the network processor of the network device may modify the source MAC address field of the packet to a field including the priority and the ingress port number of the packet. When the network device sends the packet to the MAC chip of the second physical port, the MAC chip of the second physical port first extracts information about the port numbers and the priority of the packet. Then, the MAC chip of the second physical port adds information about a new source MAC address to the source MAC address field of the packet. In this way, modification of a value of the source MAC address field by the network processor does not affect normal forwarding of the packet. The CPU classifies processing delays for packets based on ingress port numbers, egress port numbers, and priorities, to collect statistics about processing delays of the network device when forwarding the packets with different priorities at different ingress ports and egress ports. Therefore, the processing delays for the packets in different combinations of ingress ports, egress ports, and priorities can be reported to a user.

In another possible implementation, the method further includes that the MAC chip of the first physical port adds an ingress port number of the packet to the packet before sending the packet. The ingress port number is a port number of an ingress port of the packet, and the ingress port of the packet is the first physical port.

A first network processor of the network device extracts a priority and the ingress port number of the packet, and sends the priority and the ingress port number of the packet to a second network processor of the network device. The first network processor is a processor on a circuit board on which the first physical port is located. The second network processor is a processor on a circuit board on which the second physical port is located.

The second network processor extracts the priority and the ingress port number of the packet, and adds the priority and the ingress port number of the packet to a source MAC address field of the packet.

The MAC chip of the second physical port obtains an egress port number of the packet, extracts the priority and the ingress port number of the packet from the source MAC address field of the packet, and sends the priority, the ingress port number, and the egress port number of the packet to a CPU. The egress port number is a port number of an egress port of the packet, and the egress port of the packet is the second physical port. As described above, after the network processor receives the packet and before the packet reaches the MAC chip of the egress port, the source MAC address field does not need to be used again. Therefore, the second network processor of the network device may modify the source MAC address in the foregoing process to add information about the port numbers and the priority of the packet to the source MAC address field. When the packet is sent to the MAC chip of the egress port, the MAC chip of the egress port adds information about a new source MAC address to the source MAC address field of the packet. In the foregoing condition in which the normal forwarding of the packet is not affected, the second network processor adds feature information, namely, the ingress port number, the egress port number, and the priority to the source MAC address field and forwards the packet. The MAC chip of the second physical port extracts the feature information, namely, the ingress port number, the egress port number, and the priority of the packet and sends the feature information to the CPU of the network device such that packets can be classified based on priorities, ingress port numbers, and egress port numbers, thereby facilitating targeted statistics collection for processing delays for the packets with different ingress port numbers, egress port numbers, and priorities.

In another possible implementation, the MAC chip of the first physical port adds the first time stamp to a cyclic redundancy check field of the packet.

The cyclic redundancy check field is a most common type of error check code in a data communications field and is used to detect or check an error that may occur in data transmission. The cyclic redundancy check field checks, in the MAC chip of the ingress port of the network device, whether there is a data transmission error in the packet, and does not need to perform a function of checking when passing from the MAC chip of the ingress port of the network device to the MAC chip of the second physical port. In addition, after extracting the feature information of the packet from the packet, the MAC chip of the second physical port adds a new CRC field to the packet. Therefore, modification of a value of the cyclic redundancy check field by the MAC chip of the first physical port does not affect normal sending of the packet.

According to a second aspect, this application provides a delay measurement device, and the device includes a processor, a first physical port, and a second physical port. The first physical port includes a physical layer chip of the first physical port and a MAC chip of the first physical port.

The second physical port includes a physical layer chip of the second physical port and a MAC chip of the second physical port.

The physical layer chip of the first physical port is configured to receive a packet, and send a first time stamp and the packet to the MAC chip of the first physical port. A value of the first time stamp is a time point at which the packet reaches the physical layer chip of the first physical port.

The MAC chip of the first physical port is configured to add the first time stamp to the packet, and send the packet.

The MAC chip of the second physical port is configured to receive the packet, extract the first time stamp of the packet, send the packet to the physical layer chip of the second physical port, and receive a second time stamp sent by the physical layer chip of the second physical port.

The physical layer chip of the second physical port is configured to receive the packet, and send the second time stamp to the MAC chip of the second physical port. A value of the second time stamp is a time point at which the packet reaches the physical layer chip of the second physical port.

The processor is configured to obtain a processing delay for the packet, where the processing delay is a value obtained by subtracting the first time stamp from the second time stamp.

In the foregoing solution, the device can measure processing delays for various types of packets, and can further measure a delay when the packet passes from the physical layer chip of the ingress port to the physical layer chip of the egress port of the device, making a physical boundary of a measurement path clearer such that the delay of the device for processing the packet can be more accurately measured.

In a possible implementation, the processor is configured to receive the processing delay for the packet from the MAC chip of the second physical port.

The MAC chip of the second physical port is further configured to calculate the processing delay for the packet.

In the foregoing solution, the MAC chip of the second physical port of the device calculates the processing delay for the packet such that the CPU does not need to calculate the delay, thereby reducing load of the CPU.

In another possible implementation, the device further includes a network processor. The MAC chip of the first physical port is further configured to add an ingress port number of the packet to the packet. The ingress port number is a port number of an ingress port of the packet. The ingress port of the packet is the first physical port.

The network processor is configured to extract a priority and the ingress port number of the packet, and add the priority and the ingress port number of the packet to a source MAC address field of the packet.

The MAC chip of the second physical port is further configured to obtain an egress port number of the packet, extract the priority and the ingress port number of the packet from the source MAC address field of the packet, and send the priority, the ingress port number, and the egress port number of the packet to a CPU. The egress port number is a port number of an egress port of the packet. The egress port of the packet is the second physical port.

In the foregoing solution, the device adds the feature information of the packet to the source MAC address field, forwards the packet, and then sends the feature information, namely, the ingress port number, the egress port number, and the priority of the packet to the CPU of the network device such that packets can be classified based on priorities, thereby facilitating targeted statistics collection for processing delays for the packets with different priorities.

In another possible implementation, the device further includes a first network processor and a second network processor. The MAC chip of the first physical port is further configured to add an ingress port number of the packet to the packet before sending the packet. The ingress port number is a port number of an ingress port of the packet, and the ingress port of the packet is the first physical port.

The first network processor is configured to extract a priority and the ingress port number of the packet, and send the priority and the ingress port number of the packet to the second network processor. The first network processor is a processor on a circuit board on which the first physical port is located. The second network processor is a processor on a circuit board on which the second physical port is located.

The second network processor is configured to extract the priority and the ingress port number of the packet, and add the priority and the ingress port number of the packet to a source MAC address field of the packet.

The MAC chip of the second physical port is further configured to obtain an egress port number of the packet, extract the priority and the ingress port number of the packet from the source MAC address field of the packet, and send the priority, the ingress port number, and the egress port number of the packet to a CPU. The egress port number is a port number of an egress port of the packet. The egress port of the packet is the second physical port.

In the foregoing solution, the second network processor adds the feature information of the packet to the source MAC address field, forwards the packet, and then the MAC chip of the second physical port extracts the feature information, namely, the ingress port number, the egress port number, and the priority of the packet, and sends the feature information to the CPU of the network device such that packets can be classified based on priorities, thereby facilitating targeted statistics collection for processing delays for the packets with different priorities.

In another possible implementation, the MAC chip of the first physical port adds the first time stamp to a cyclic redundancy check field of the packet.

In the foregoing solution, the MAC chip of the first physical port of the network device adds the time stamp to the cyclic redundancy check field of the packet such that a length of the packet is prevented from being increased by directly adding a field to the packet and a bandwidth is prevented from being wasted.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show some embodiments of the present disclosure, and a person of ordinary skill in the art may still derive other drawings from these accompanying drawings without creative efforts.

FIG. 1 is a schematic diagram of a possible application scenario according to an embodiment of the present disclosure;

FIG. 2 is a schematic flowchart of a delay measurement method according to an embodiment of the present disclosure;

DESCRIPTION OF EMBODIMENTS

Figure 3A:
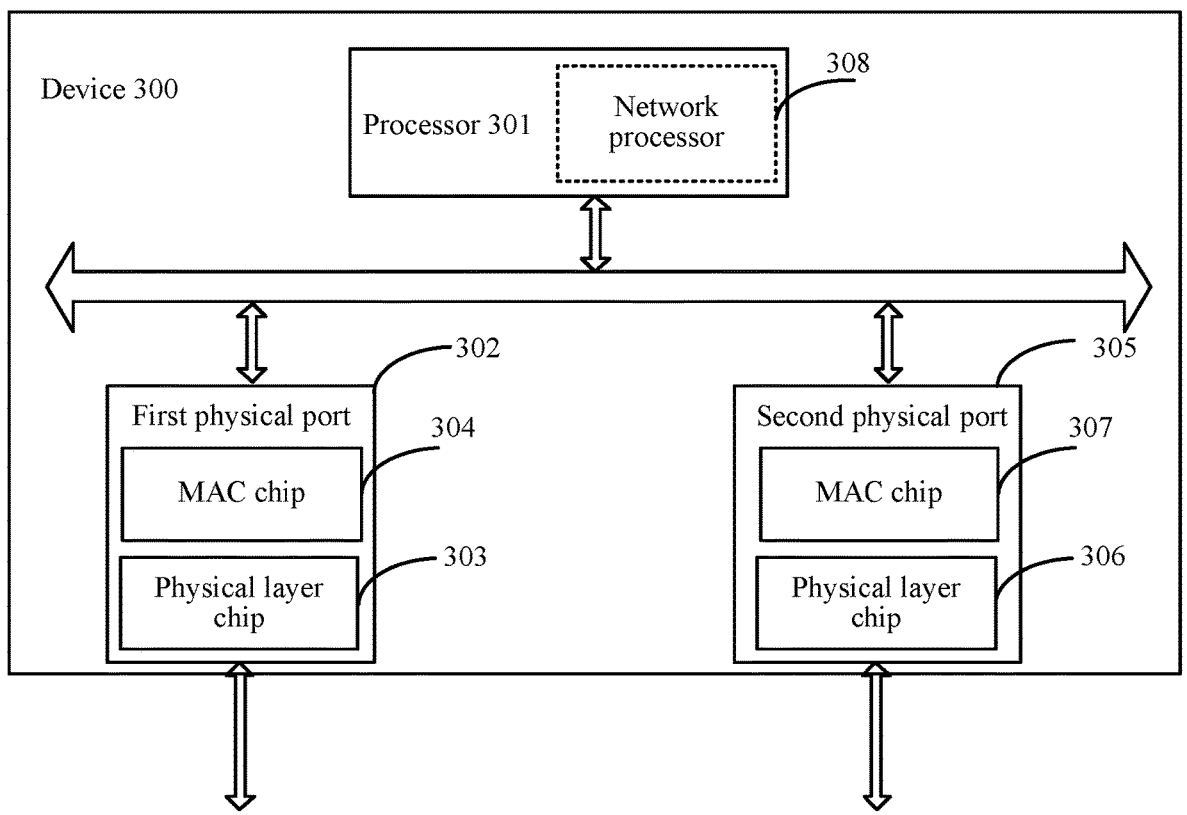
FIG. 3A is a schematic structural diagram of a delay measurement device according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

FIG. 1 is a schematic diagram of an application scenario according to an embodiment of the present disclosure. A network device 101 may be a forwarding device such as a router, a switch, an optical transport network (OTN) device, a packet transport network (PTN) device, and a wavelength-division multiplexing (WDM) device.

To more accurately measure a processing delay of the network device, as shown in FIG. 1, in the application scenario provided in this embodiment of the present disclosure, in this application, a delay of the network device for processing a packet, that is, a delay from an ingress port 103 to an egress port 104 in a process in which the packet passes through the network device 101 is measured. As described above, the network device 101 may be the foregoing forwarding device. In this way, no bandwidth is wasted and forwarding of another normal service packet is not affected. In addition, delays of the network device 101 for processing various types of packets can be more accurately measured, and based on this, delays in a network can be segmented to be accurately distinguished and displayed thereby facilitating network congestion fault location.

FIG. 2 is a schematic flowchart of a delay measurement method according to an embodiment of the present disclosure. For example, the method may be applied to the application scenario shown in FIG. 1. A network device in the method shown in FIG. 2 may be the network device 101 or a network device 102 shown in FIG. 1. The method includes the following steps.

Step S201. A physical layer chip of a first physical port of the network device receives a packet and sends a first time stamp and the packet to a MAC chip of the first physical port. A value of the first time stamp is a time point at which the packet reaches the physical layer chip of the first physical port.

The physical layer chip of an ingress port of the network device records the value of the first time stamp in a register of the physical layer chip when receiving the packet. The first time stamp is used to indicate the time at which the packet passes through the physical layer chip of the ingress port. Then, the physical layer chip of the ingress port sends the received packet and the first time stamp to a MAC chip of the ingress port. The foregoing packet is any packet normally received and forwarded by the network device and may not be a detection packet.

Step S202. The MAC chip of the first physical port adds the first time stamp to the packet and sends the packet.

For example, the MAC chip of the ingress port adds time stamps to the packet one by one, and the physical layer chip of the ingress port takes a very short time to send the first time stamp to the MAC chip. Therefore, the MAC chip of the ingress port receives, almost at the same time, the packet and the first time stamp sent by the physical layer chip of the ingress port. The MAC chip of the ingress port may directly add the first time stamp to the packet. The MAC chip of the ingress port may further add the first time stamp to an available field of the packet.

Optionally, the MAC chip of the first physical port adds the first time stamp to a cyclic redundancy check field of the packet.

As described in the foregoing step S202, the MAC chip adds the first time stamp to the packet in three manners. The cyclic redundancy check field of the packet does not need to be used after the packet enters the ingress port of the network device and before the packet reaches an egress port of the network device. Therefore, in this manner in which the MAC chip of the ingress port of the network device adds the first time stamp to the cyclic redundancy check field of the packet, a length of the packet is not increased and no bandwidth is wasted.

Optionally, the method further includes that the MAC chip of the first physical port adds an ingress port number of the packet to the packet before sending the packet. The ingress port number is a port number of an ingress port of the packet. The ingress port of the packet is the first physical port. A network processor of the network device extracts a priority and the ingress port number of the packet, and adds the priority and the ingress port number of the packet to a source MAC address field of the packet. A MAC chip of a second physical port obtains an egress port number of the packet, extracts the priority and the ingress port number of the packet from the source MAC address field of the packet, and sends the priority, the ingress port number, and the egress port number of the packet to a CPU. The egress port number is a port number of an egress port of the packet, and the egress port of the packet is the second physical port.

For example, the MAC chip of the ingress port adds the obtained ingress port number to the packet. After receiving the packet sent by the MAC chip of the ingress port, the network processor of the network device extracts information about the priority and the ingress port number of the packet from the packet, then adds the information to the source MAC address field of the packet, and then sends the packet to the MAC chip of the egress port. The MAC chip of the egress port sends the obtained egress port number and the information that is about the ingress port number and the priority and that is obtained from the packet to the CPU to record the information about the priority, the egress port number, and the ingress port number that correspond to the packet.

Optionally, the method further includes that the MAC chip of the first physical port adds an ingress port number of the packet to the packet before sending the packet. The ingress port number is a port number of an ingress port of the packet, and the ingress port of the packet is the first physical port.

A first network processor of the network device extracts a priority and the ingress port number of the packet, and sends the priority and the ingress port number of the packet to a second network processor of the network device. The first network processor is a processor on a circuit board on which the first physical port is located. The second network processor is a processor on a circuit board on which the second physical port is located.

The second network processor extracts the priority and the ingress port number of the packet, and adds the priority and the ingress port number of the packet to a source MAC address field of the packet.

The MAC chip of the second physical port obtains an egress port number of the packet, extracts the priority and the ingress port number of the packet from the source MAC address field of the packet, and sends the priority, the ingress port number, and the egress port number of the packet to a CPU. The egress port number is a port number of an egress port of the packet, and the egress port of the packet is the second physical port. For example, the network device includes a plurality of network processors. A network processor on a circuit board on which the ingress port of the packet is located extracts the information about the ingress port number and the priority of the packet from the packet, and sends, through information exchange between modules, the feature information to a network processor on a circuit board on which the egress port of the packet is located. The source MAC address field of the packet does not need to be used in a process from when the packet enters the ingress port of the network device to when the packet is sent to the egress port. Therefore, the network processor on the circuit board on which the egress port is located adds the feature information of the packet to the source MAC address field of the packet, and sends the packet to the MAC chip of the egress port of the packet. The MAC chip of the egress port extracts the foregoing feature information from the packet, and sends the feature information of the packet and the egress port number to the CPU. In the foregoing solution, the feature information of the packet and the packet are sent at the same time from the network processor on the circuit board on which the ingress port is located to the network processor on the circuit board on which the egress port is located, and the MAC chip of the egress port extracts the first time stamp and the foregoing feature information of the packet at the same time.

Step S203. A MAC chip of a second physical port receives the packet, extracts the first time stamp of the packet, and sends the packet to a physical layer chip of the second physical port.

For example, after receiving the packet, the MAC chip of the egress port of the packet extracts the value of the first time stamp from the packet, and sends the packet to the physical layer chip of the ingress port.

Step S204. The MAC chip of the second physical port receives a second time stamp of the packet. The second time stamp is sent by the physical layer chip of the second physical port. A value of the second time stamp is a time point at which the packet reaches the physical layer chip of the second physical port.

The MAC chip of the egress port sends the packet to the physical layer chip of the egress port. The physical layer chip of the egress port records the second time stamp using a register of the physical layer chip, and sends the second time stamp to the MAC chip of the egress port. The MAC chip extracts the first time stamp from the packet and receives the second time stamp almost at the same time. The MAC chip of the egress port obtains the values of the first time stamp and the second time stamp almost at the same time. Therefore, the MAC chip determines that the first time stamp and the second time stamp are times at which a same packet reaches different physical layer chips.

Step S205. The network device calculates a processing delay for the packet. The processing delay is a value obtained by subtracting the first time stamp from the second time stamp.

After obtaining the first time stamp and the second time stamp, the network device obtains the processing delay using the value obtained by subtracting the first time stamp from the second time stamp. The network device may calculate a delay using a service chip such as a MAC chip, or may calculate a delay using a processor of the network device.

In the foregoing solution, a delay may be measured using any packet such that no bandwidth is wasted and forwarding of a normal service packet is not affected. In addition, delays measured using the method include from the physical layer chip at the ingress port of the network device to the physical layer chip at the egress port of the same network device. This not only makes a physical boundary of a measurement path clearer and more complete, but also can accurately distinguish and display forwarding delays for the network device. In addition, network congestion can be more accurately located after the delays in the network are segmented and distinguished.

Optionally, that the network device calculates a processing delay for the packet includes The MAC chip of the second physical port calculates the processing delay for the packet.

After extracting the first time stamp from the packet and obtaining the second time stamp from the physical layer chip of the egress port, the MAC chip of the egress port directly obtains the value of the processing delay by subtracting the first time stamp from the second time stamp, and does not need to upload the time stamps obtained by the MAC chip of the egress port to the processor for calculating, thereby reducing a waste of bandwidths.

Figure 3B:
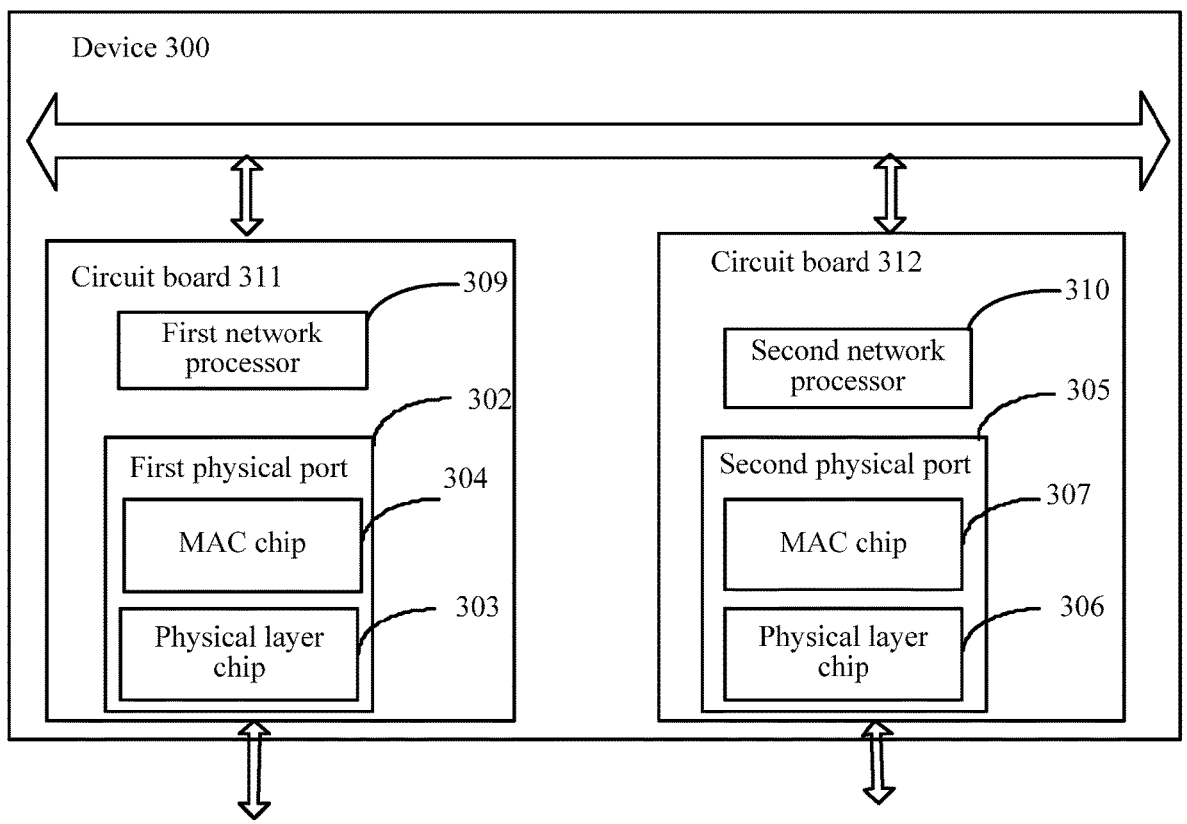
FIG. 3B is a schematic structural diagram of another delay measurement device according to an embodiment of the present disclosure.

FIG. 3A and FIG. 3B show two different schematic structural diagrams of a delay measurement device according to an embodiment of the present disclosure. For example, the device may be applied to the application scenario shown in FIG. 1. The device shown in FIG. 3A and FIG. 3B may be the network device 101 and the network device 102 in the application scenario in FIG. 1 and the network device in the method in FIG. 2. The device includes a processor 301, a first physical port 302, and a second physical port 305. The first physical port 302 includes a physical layer chip 303 of the first physical port and a MAC chip 304 of the first physical port. The second physical port 305 includes a physical layer chip 306 of the second physical port and a MAC chip 307 of the second physical port.

The physical layer chip 303 of the first physical port is configured to receive a packet, and send a first time stamp and the packet to the MAC chip 304 of the first physical port. A value of the first time stamp is a time point at which the packet reaches the physical layer chip 303 of the first physical port 302.

The MAC chip 304 of the first physical port is configured to add the first time stamp to the packet, and send the packet.

The MAC chip 307 of the second physical port 305 is configured to receive the packet, extract the first time stamp of the packet, send the packet to the physical layer chip 306 of the second physical port 305, and receive a second time stamp sent by the physical layer chip 306 of the second physical port 305.

The physical layer chip 306 of the second physical port 305 is configured to receive the packet, and send the second time stamp to the MAC chip 307 of the second physical port 305. A value of the second time stamp is a time point at which the packet reaches the physical layer chip 306 of the second physical port 305.

The processor 301 is configured to obtain a processing delay for the packet. The processing delay is a value obtained by subtracting the first time stamp from the second time stamp.

In the foregoing solution, the device 300 can measure processing delays for various types of packets, and can further measure a delay for the packet from a physical layer chip of an ingress port to a physical layer chip of an egress port of the device such that the delay of the device for processing the packet can be more accurately measured.

Optionally, the processor 301 is configured to receive a processing delay for the packet from the MAC chip 307 of the second physical port 305.

The MAC chip 307 of the second physical port 305 is further configured to calculate the processing delay for the packet.

Optionally, as shown in FIG. 3A, the device 300 further includes a network processor 308. The MAC chip 304 of the first physical port 302 is further configured to add an ingress port number of the packet to the packet. The ingress port number is a port number of an ingress port of the packet. The ingress port of the packet is the first physical port 302.

The network processor 308 is configured to extract a priority and the ingress port number of the packet, and add the priority and the ingress port number of the packet to a source MAC address field of the packet.

The MAC chip 307 of the second physical port 305 is further configured to obtain an egress port number of the packet, extract the priority and the ingress port number of the packet from the source MAC address field of the packet, and send the priority, the ingress port number, and the egress port number of the packet to a CPU. The egress port number is a port number of an egress port of the packet. The egress port of the packet is the second physical port 305.

For example, when the device 300 is a router, regardless of whether the router is a small-scale access router or a large-scale core router, a network processor of the router can extract information about the ingress port number and the priority of the packet and add the information to the source MAC address field of the packet to facilitate extraction by the MAC chip of the egress port. Then, the network processor 308 of the router sends the packet to the MAC chip 307 of the second physical port 305. The MAC chip 307 of the second physical port 305 extracts and matches the ingress port number and the priority of the packet with the first time stamp and the second time stamp.

Optionally, as shown in FIG. 3B, the device 300 further includes a first network processor 309 and a second network processor 310. The MAC chip 304 of the first physical port 302 is further configured to add an ingress port number of the packet to the packet before sending the packet. The ingress port number is a port number of an ingress port of the packet. The ingress port of the packet is the first physical port 302.

The first network processor 309 is configured to extract a priority and the ingress port number of the packet, and send the priority and the ingress port number of the packet to the second network processor 310. The first network processor 309 is a processor on a circuit board 311 on which the first physical port 302 is located. The second network processor 310 is a processor on a circuit board 312 on which the second physical port 305 is located.

The second network processor 310 is configured to extract the priority and the ingress port number of the packet, and add the priority and the ingress port number of the packet to the source MAC address field of the packet.

The MAC chip of the second physical port 305 is further configured to obtain an egress port number of the packet, extract the priority and the ingress port number of the packet from the source MAC address field of the packet, and send the priority, the ingress port number, and the egress port number of the packet to a CPU. The egress port number is a port number of an egress port of the packet. The egress port of the packet is the second physical port 305.

For example, for a large-scale core router having a plurality of network processors, a network processor on a circuit board on which an ingress port is located extracts the information about the ingress port number and the priority of the packet from the packet. The information and the packet are sent at the same time, through information transmission between modules, to the network processor on the circuit board on which the egress port is located. The MAC chip of the egress port extracts the information about the ingress port number and the priority of the packet from the packet, and sends both the information and the obtained egress port number to the CPU of the device.

Optionally, the MAC chip 304 of the first physical port adds the first time stamp to a cyclic redundancy check field of the packet.

A person of ordinary skill in the art may understand that all or some of the steps in each of the foregoing method of the embodiments may be implemented by a program instructing a processor. The foregoing program may be stored in a computer-readable storage medium. The storage medium may be a random-access memory, a read-only memory, a flash memory, a hard disk, a solid state drive, a magnetic tape, a floppy disk, an optical disc, or any combination thereof.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A delay measurement method, comprising:
   receiving, by a first physical layer chip of a first physical port of a network device, a packet;
   sending, by the first physical layer chip, a first time stamp and the packet to a first Media Access Control (MAC) chip of the first physical port, wherein a value of the first time stamp is a time point at which the packet reaches the first physical layer chip;
   adding, by the first MAC chip, the first time stamp to the packet;
   sending, by the first MAC chip, the packet to a second MAC chip of a second physical port;
   receiving, by the second MAC chip, the packet;
   extracting, by the second MAC chip, the first time stamp of the packet;
   sending, by the second MAC chip, the packet to a second physical layer chip of the second physical port;
   receiving, by the second MAC chip, a second time stamp of the packet from the second physical layer chip, wherein a value of the second time stamp is a time point at which the packet reaches the second physical layer chip; and
   calculating, by the network device, a processing delay for the packet by subtracting the first time stamp from the second time stamp.

2. The delay measurement method of claim 1, wherein calculating the processing delay comprises calculating, by the second MAC chip, the processing delay for the packet.

3. The delay measurement method of claim 2, further comprising:
   adding, by the first MAC chip, ingress port number of the packet to the packet before sending the packet, wherein the ingress port number is a port number of an ingress port of the packet, and wherein the ingress port of the packet is the first physical port;
   extracting, by a network processor of the network device, a priority and the ingress port number of the packet;
   adding, by the network processor, the priority and the ingress port number of the packet to a source MAC address field of the packet;
   obtaining, by the second MAC chip egress port number of the packet;
   extracting, by the second MAC chip, the priority and the ingress port number of the packet from the source MAC address field of the packet; and
   sending, by the second MAC chip, the priority, the ingress port number, and the egress port number of the packet to a central processing unit (CPU), wherein the egress port number is a port number of an egress port of the packet, and wherein the egress port of the packet is the second physical port.

4. The delay measurement method of claim 2, further comprising:
   adding, by the first MAC chip, an ingress port number of the packet to the packet before sending the packet, wherein the ingress port number is a port number of an ingress port of the packet, and wherein the ingress port of the packet is the first physical port;
   extracting, by a first network processor of the network device, a priority and the ingress port number of the packet;
   sending, by the first network processor, the priority and the ingress port number of the packet to a second network processor of the network device, wherein the first network processor is a processor on a circuit board on which the first physical port is located, and wherein the second network processor is a processor on a circuit board on which the second physical port is located;
   extracting, by the second network processor, the priority and the ingress port number of the packet;
   adding, by the second network processor, the priority and the ingress port number of the packet to a source MAC address field of the packet;
   obtaining, by the second MAC chip, an egress port number of the packet;
   extracting, by the second MAC chip, the priority and the ingress port number of the packet from the source MAC address field of the packet;
   sending, by the second MAC chip, the priority, the ingress port number, and the egress port number of the packet to a central processing unit (CPU) wherein the egress port number is a port number of an egress port of the packet, and wherein the egress port of the packet is the second physical port.

5. The delay measurement method of claim 2, further comprising adding, by the first MAC chip, the first time stamp to a cyclic redundancy check field of the packet.

6. The delay measurement method of claim 1, further comprising:
   adding, by the first MAC chip, an ingress port number of the packet to the packet before sending the packet, wherein the ingress port number is a port number of an ingress port of the packet, and wherein the ingress port of the packet is the first physical port;
   extracting, by a network processor of the network device, a priority and the ingress port number of the packet;

adding, by the network processor, the priority and the ingress port number of the packet to a source MAC address field of the packet;
obtaining, by the second MAC chip, an egress port number of the packet;
extracting, by the second MAC chip, the priority and the ingress port number of the packet from the source MAC address field of the packet; and
sending, by the second MAC chip, the priority, the ingress port number, and the egress port number of the packet to a central processing unit (CPU), wherein the egress port number is a port number of an egress port of the packet, and wherein the egress port of the packet is the second physical port.

7. The delay measurement method of claim 6, further comprising adding, by the first MAC chip, the first time stamp to a cyclic redundancy check field of the packet.

8. The delay measurement method of claim 1, further comprising:
adding, by the first MAC chip, an ingress port number of the packet to the packet before sending the packet, wherein the ingress port number is a port number of an ingress port of the packet, and wherein the ingress port of the packet is the first physical port;
extracting, by a first network processor of the network device, a priority and the ingress port number of the packet;
sending, by the first network processor, the priority and the ingress port number of the packet to a second network processor of the network device, wherein the first network processor is a processor on a circuit board on which the first physical port is located, and wherein the second network processor is a processor on a circuit board on which the second physical port is located;
extracting, by the second network processor, the priority and the ingress port number of the packet;
adding, by the second network processor, the priority and the ingress port number of the packet to a source MAC address field of the packet;
obtaining, by the second MAC chip, an egress port number of the packet;
extracting, by the second MAC chip, the priority and the ingress port number of the packet from the source MAC address field of the packet; and
sending, by the second MAC chip, the priority, the ingress port number, and the egress port number of the packet to a central processing unit (CPU), wherein the egress port number is a port number of an egress port of the packet, and wherein the egress port of the packet is the second physical port.

9. The delay measurement method of claim 8, further comprising adding, by the first MAC chip, the first time stamp to a cyclic redundancy check field of the packet.

10. The delay measurement method of claim 1, wherein further comprising adding, by the first MAC chip, the first time stamp to a cyclic redundancy check field of the packet.

11. A delay measurement device, comprising:
a first physical port comprising:
a first physical layer chip configured to:
receive a packet; and
send a first time stamp and the packet, wherein a value of the first time stamp is a time point at which the packet reaches the first physical layer chip; and
a first Media Access Control (MAC) chip coupled to the first physical layer chip and configured to:
receive the first time stamp and the packet;
add the first time stamp to the packet; and
send the packet;
a second physical port coupled to the first physical port and comprising:
a second physical layer chip; and
a second MAC chip coupled to the second physical layer chip and configured to:
receive the packet;
extract the first time stamp of the packet;
send the packet to the second physical leer chip,
wherein the second physical layer chip is configured to:
receive the packet; and
send a second time stamp to the second MAC chip, wherein a value of the second time stamp is a time point at which the packet reaches the second physical layer chip, and
wherein the second MAC chip is further configured to receive the second time stamp from the second physical layer chip; and
a processor coupled to the first physical port and the second physical port and configured to obtain a processing delay for the packet by subtracting the first time stamp from the second time stamp.

12. The delay measurement device of claim 11, wherein the processor is further configured to receive the processing delay for the packet from the second MAC chip, and wherein the second MAC chip is further configured to calculate the processing delay for the packet.

13. The delay measurement device of claim 12, further comprising a network processor, wherein the first MAC chip is further configured to add an ingress port number of the packet to the packet, wherein the ingress port number is a port number of an ingress port of the packet, wherein the ingress port of the packet is the first physical port, and wherein the network processor is configured to:
extract a priority and the ingress port number of the packet; and
add the priority and the ingress port number of the packet to a source MAC address field of the packet, and
wherein the second MAC chip is further configured to:
obtain an egress port number of the packet;
extract the priority and the ingress port number of the packet from the source MAC address field of the packet; and
send the priority, the ingress port number, and the egress port number of the packet to a central processing unit (CPU), wherein the egress port number is a port number of an egress port of the packet, and wherein the egress port of the packet is the second physical port.

14. The delay measurement device of claim 12, further comprising a first network processor and a second network processor, wherein the first network processor is a processor on a circuit board on which the first physical port is located, wherein the second network processor is a processor on a circuit board on which the second physical port is located, wherein the first MAC chip is further configured to add an ingress port number of the packet to the packet before sending the packet, wherein the ingress port number is a port number of an ingress port of the packet, wherein the ingress port of the packet is the first physical port, and wherein the first network processor is configured to:
extract a priority and the ingress port number of the packet; and
send the priority and the ingress port number of the packet to the second network processor,
wherein the second network processor is configured to:

extract the priority and the ingress port number of the packet; and add the priority and the ingress port number of the packet to a source MAC address field of the packet, wherein the second MAC chip is further configured to:
obtain an egress port number of the packet;
extract the priority and the ingress port number of the packet from the source MAC address field of the packet; and
send the priority, the ingress port number, and the egress port number of the packet to a central processing unit (CPU), wherein the egress port number is a port number of an egress port of the packet, and wherein the egress port of the packet is the second physical port.

15. The delay measurement device of claim 12, wherein the first MAC chip is further configured to add the first time stamp to a cyclic redundancy check field of the packet.

16. The delay measurement device of claim 11, further comprising a network processor, wherein the first MAC chip is further configured to add an ingress port number of the packet to the packet, wherein the ingress port number is a port number of an ingress port of the packet, wherein the ingress port of the packet is the first physical port, and wherein the network processor is configured to:
extract a priority and the ingress port number of the packet; and
add the priority and the ingress port number of the packet to a source MAC address field of the packet, and
wherein the second MAC chip is further configured to:
obtain an egress port number of the packet;
extract the priority and the ingress port number of the packet from the source MAC address field of the packet; and
send the priority, the ingress port number, and the egress port number of the packet to a central processing unit (CPU), wherein the egress port number is a port number of an egress port of the packet, and wherein the egress port of the packet is the second physical port.

17. The delay measurement device of claim 16, wherein the first MAC chip is further configured to add the first time stamp to a cyclic redundancy check field of the packet.

18. The delay measurement device of claim 11, further comprising a first network processor and a second network processor, wherein the first network processor is a processor on a circuit board on which the first physical port is located, wherein the second network processor is a processor on a circuit board on which the second physical port is located, wherein the first MAC chip is further configured to add an ingress port number of the packet to the packet before sending the packet, wherein the ingress port number is a port number of an ingress port of the packet, wherein the ingress port of the packet is the first physical port, and wherein the first network processor is configured to:
extract a priority and the ingress port number of the packet; and
send the priority and the ingress port number of the packet to the second network processor,
wherein the second network processor is configured to:
extract the priority and the ingress port number of the packet; and
add the priority and the ingress port number of the packet to a source MAC address field of the packet, and
wherein the second MAC chip is further configured to:
obtain an egress port number of the packet;
extract the priority and the ingress port number of the packet from the source MAC address field of the packet; and
send the priority, the ingress port number, and the egress port number of the packet to a central processing unit (CPU), wherein the egress port number is a port number of an egress port of the packet, and wherein the egress port of the packet is the second physical port.

19. The delay measurement device of claim 18, wherein the first MAC chip is further configured to add the first time stamp to a cyclic redundancy check field of the packet.

20. The delay measurement device of claim 11, wherein the first MAC chip is further configured to add the first time stamp to a cyclic redundancy check field of the packet.

* * * * *